United States Patent [19]

Sarette et al.

[11] Patent Number: 4,647,001
[45] Date of Patent: Mar. 3, 1987

[54] MOLD HOLDING APPARATUS

[76] Inventors: Richard R. Sarette; Patricia L. Sarette, both of P.O. Box 311, Diamond Springs, Calif. 95619

[21] Appl. No.: 729,430

[22] Filed: May 1, 1985

[51] Int. Cl.$^4$ .................. B29C 33/34; B29C 33/30
[52] U.S. Cl. .................... 249/205; 269/71; 425/435
[58] Field of Search .............. 249/118, 120, 205; 425/425, 435; 269/71

[56] References Cited

U.S. PATENT DOCUMENTS

| | | | |
|---|---|---|---|
| 233,608 | 10/1880 | Fleming . | |
| 274,298 | 3/1883 | Espel | 425/435 |
| 286,825 | 10/1883 | Howdon . | |
| 307,075 | 10/1884 | Tunstill | 425/435 |
| 375,211 | 12/1887 | Smith et al. . | |
| 2,418,852 | 4/1947 | Rothstein | 425/425 |
| 2,540,199 | 2/1951 | Gorlinski | 22/91 |
| 3,173,175 | 3/1965 | Lemelson | 425/435 |
| 3,457,899 | 7/1969 | Kelch et al. | 269/71 |
| 3,474,165 | 10/1969 | Rakes et al. | 425/435 |
| 3,510,911 | 5/1970 | Alter | 425/435 |
| 3,616,494 | 11/1971 | Natter | 425/425 |
| 3,994,659 | 11/1976 | Takahashi | 425/425 |
| 4,046,272 | 9/1977 | Hayward | 214/312 |
| 4,050,875 | 9/1977 | Katzman | 425/435 |
| 4,067,562 | 1/1978 | Weber | 269/71 |
| 4,130,158 | 12/1978 | Kulig et al. | 425/435 |
| 4,361,307 | 11/1982 | Benavidez | 249/118 |

FOREIGN PATENT DOCUMENTS

| | | | |
|---|---|---|---|
| 2413024 | 10/1975 | Fed. Rep. of Germany | 269/71 |
| 2815407 | 10/1979 | Fed. Rep. of Germany | 269/71 |

Primary Examiner—Willard E. Hoag
Attorney, Agent, or Firm—Craig A. Wood

[57] ABSTRACT

A mold holding apparatus is disclosed for securely holding plaster molds used in the production of ceramic, porcelain and plastic items permitting molds to be oriented so as to permit filling of pour holes present in molds, and to facilitate the uniform pouring off of excess slip. The apparatus includes adjustable retainers for removeable attachment of a mold to a rotatable platform, and center of mass adjustments and frictional contact surfaces for uniform rate of pouring off of excess slip.

1 Claim, 5 Drawing Figures

MOLD HOLDING APPARATUS

BACKGROUND OF THE INVENTION

1. Field of the Invention

The present invention relates to mold holding apparatus and in particular to mold holding apparatus which are suitable to hold plaster molds during filling and pouring off operations for the production of small ceramic, porcelain and plastic items such as dolls, toys, and figurines.

2. Description of Prior Art

Small ceramic, porcelain and plastic items are now commonly produced by pouring slip into hand-held plaster molds, requiring considerable strength and stamina to maintain the mold in the proper position until the slip sets, and thereafter pouring off excess slip slowly and uniformly. Various devices have been proposed to assist such casting process, including the devices of U.S. Pat. Nos. 4,361,307, 4,046,272, 2,540,199, 375,211, 286,825 and 233,608.

Despite the availability of such devices, there exists a need in the art for an improved mold holding apparatus that will easily and securely support a mold and permits excess slip to be properly poured off, yet may be used for molds having a plurality of pour holes located on various surfaces of the mold.

SUMMARY OF THE INVENTION

In order to aid in the understanding of the present invention, it can be stated in essentially summary form that it is directed to a mold holding apparatus that is capable of securely holding plaster molds of various shapes and sizes, permitting orientation of the mold so that slip may be sequentially poured into the mold and excess slip poured out of the mold by way of a plurality of pour holes. To this end, a mold is secured to a platform by a quick release hold down and by curved retaining rods. The platform is rotatable about one horizontal axis is a first embodiment, and is rotatable about two horizontal axes in a second embodiment, in order to properly orient mold pour holes, and frictional couplings are provided to permit excess slip to be uniformly poured out.

It is an object of the present invention to provide a mold holding apparatus that is capable of securely holding a mold in place during the casting process.

It is another object of the present invention to provide a mold holding apparatus that is capable of permitting excess slip to be poured from a mold at slow and uniform rate.

It is still another object of the present invention to provide a mold holding apparatus that permits the casting process to occur with respect to molds having a plurality of pour holes located on various surfaces of the mold without removing the mold from the mold holding apparatus.

Further objects and advantages of this invention will be apparent from a study of the following portion of the specifications, the claims and the attached drawings.

DESCRIPTION OF THE PREFERRED EMBODIMENT

The following specification, taken in conjunction with the drawings, sets forth the preferred embodiment of the present invention. The embodiment of the invention disclosed herein is the best mode contemplated by the inventors for carrying out their invention in a commercial environment, although it should be understood that various modifications can be accomplished within the parameters of the present invention.

Figure 1:
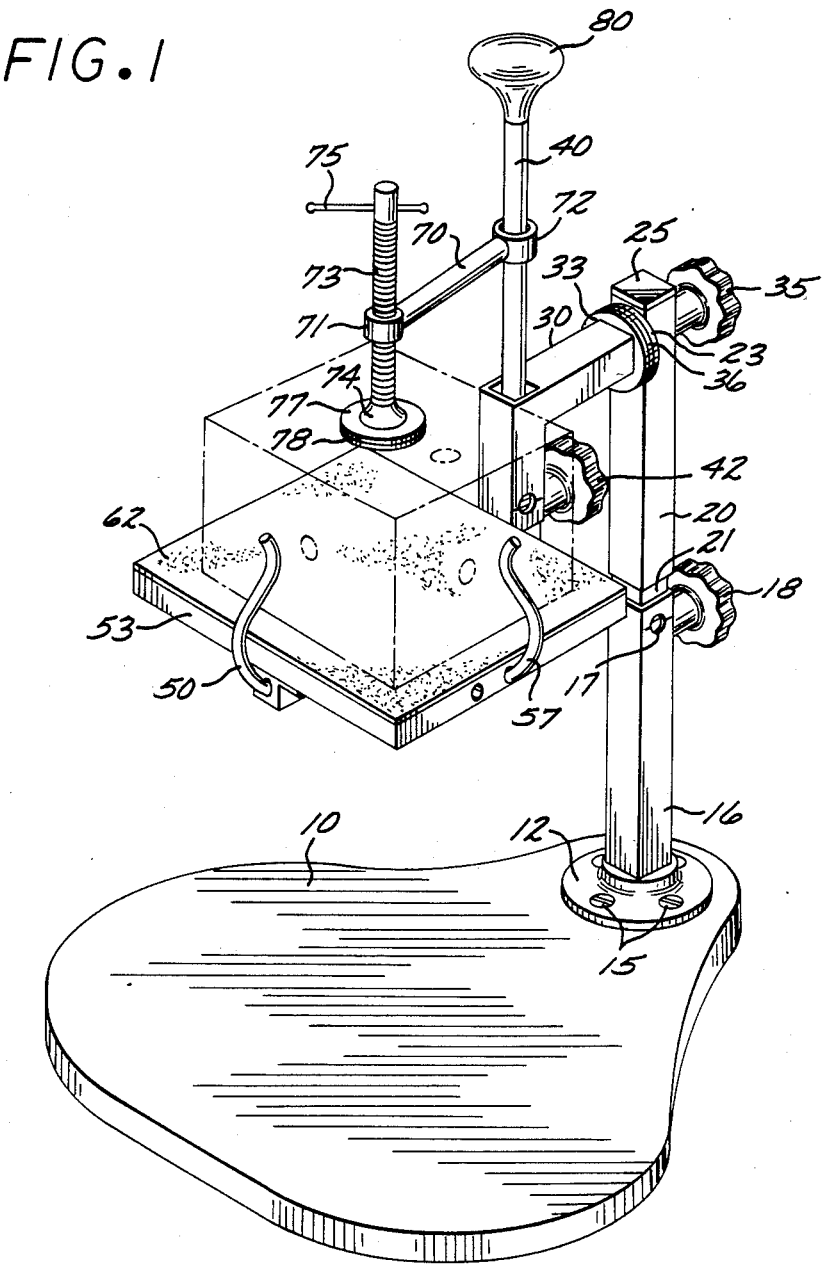
FIG. 1 is a perspective view of a mold holding apparatus embodying the present invention, with a mold indicated in phantom.
Figure 2:
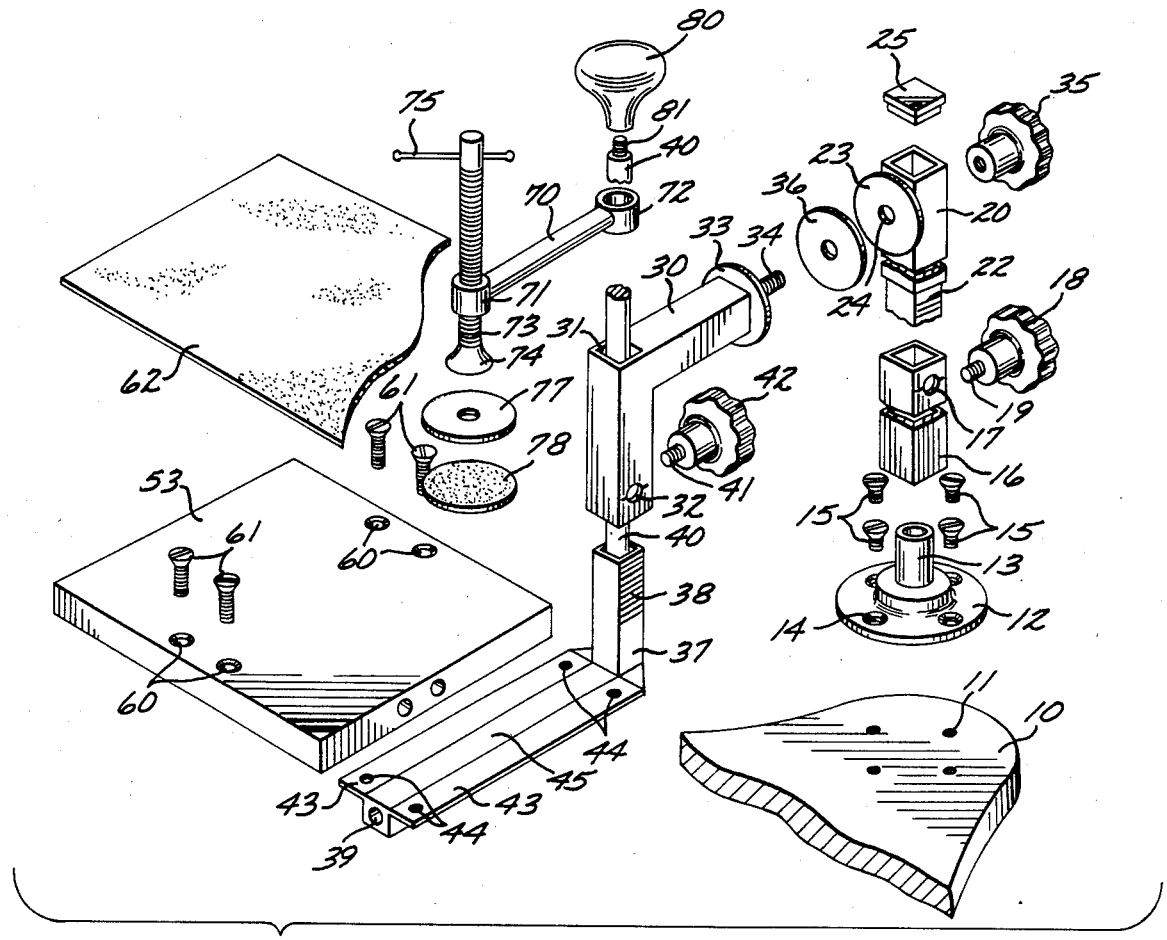
FIG. 2 is a fragmentary exploded perspective view of a mold holding apparatus embodying the present invention.

Referring now to the drawings for a detailed description of the present invention, reference is first made to FIG. 1 and FIG. 2, showing a base 10 having a plurality of mounting holes 11. Collar 12 having shaft 13 having surrounding holes 14 is attached to base 10 by collar screws 15. Lower column 16, having column sight hole 17 and lower column threaded hole (not shown), is attached vertically around shaft 13. Lower column knob 18 having threaded column knob end 19 mates with said lower column threaded hole. Upper column 20, having column neck 21, column neck striations 22, column neck detents (not shown), column surface 23, upper column hole 24 and cap 25 is slidably disposed with column neck 21 interior to lower column 16 so that column neck striations 22 are visible through column sight hole 17 and column knob end 19 engages said column neck detents.

Also as depicted in FIG. 1 and FIG. 2, upper platform arm 30, having control rod opening 31, platform arm sight hole 32, platform arm threaded hole (not shown), and platform arm surface 33 is attached to platform arm stud 34 so that platform arm stud 34 is capable of being disposed through upper column hole 24, mating with upper column knob 35, with frictional washer 36 disposed between column surface 23 and platform arm surface 33. Lower platform arm 37 having platform arm striations 38, platform arm detents (not shown), and longitudinal retaining rod bore 39 is attached to control rod 40 so that lower platform arm 37 is slidably disposed partially interior to upper platform arm 30, and so that platform arm striations 38 are visible through platform arm sight hole 32 as threaded arm knob end 41 of platform arm knob 42 engages said platform arm detents through said platform arm threaded hole, and control rod 40 is disposed through control rod opening 31. Platform arm flanges 43 having flange holes 44 are integrally attached to lower platform arm 37 to form a flat upper surface 45 as shown in FIG. 2.

Figure 3:
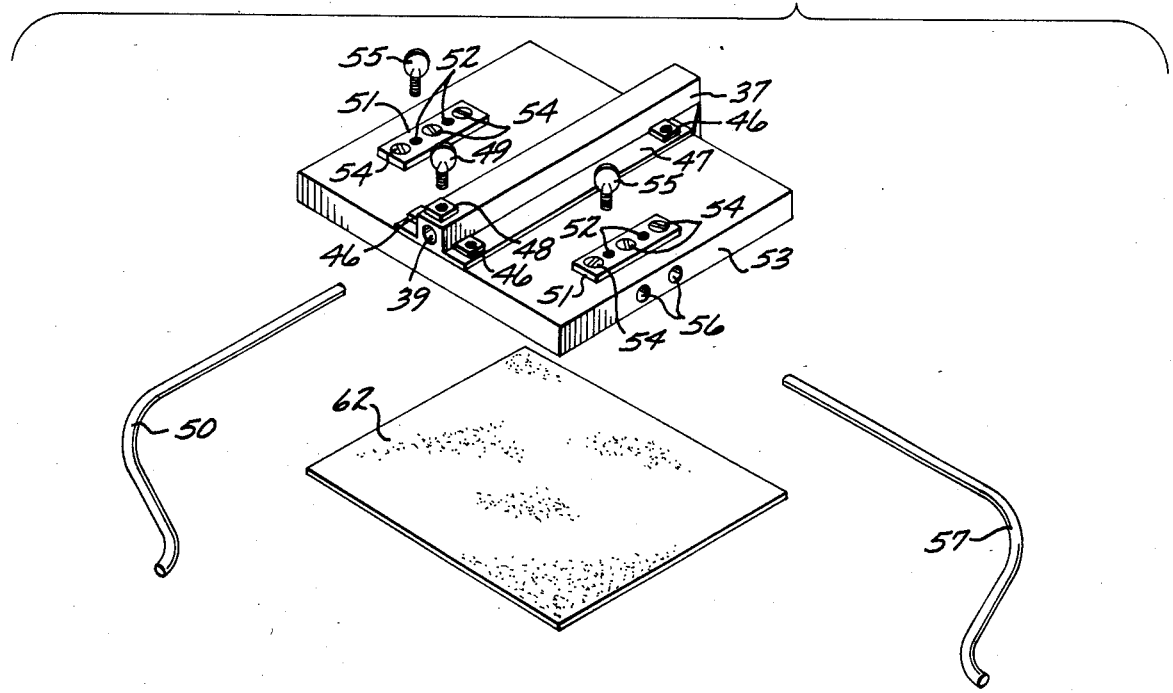
FIG. 3 is a fragmentary inverted exploded perspective view of a mold holding apparatus embodying the present invention.

As depicted in FIG. 3, nuts 46 are attached to the lower surface 47 of platform arm flanges 43. Additionally, longitudinal retaining rod nut 48 is attached to lower platform arm 37 so that longitudinal retaining rod fastener 49 mates with longitudinal retaining rod nut 48 and is capable of projecting into longitudinal retaining rod bore 39 through lower platform arm hole (not shown), securing longitudinal retaining rod 50. Platform plates 51 having threaded plate holes 52 are attached to platform 53 by plate screws 54 so that transverse retaining rod fasteners 55 mate with plate holes 52 and are capable of projecting into transverse retaining rod bores 56 through platform holes (not shown), securing transverse retaining rod 57.

As shown in FIG. 2 and FIG. 3, platform 53 having countersunk mount holes 60 is secured to lower platform arm 37 by platform fasteners 61 mating with nuts 46. Resilient platform pad 62 is glued to platform 53.

FIG. 1 and FIG. 2 depict attachment rod 70 having threaded collar 71, whose axis is perpendicular to attachment rod 70, and threaded rod sleeve 72 at the other end, whose axis is co-planar with the axis of threaded collar 71 and defines an angle of approximately 85 degrees with respect to the lower edge of attachment rod 70. Attachment stud 73 having flared end 74 mates with threaded collar 71, and stud handle 75 is orthogonally and slidably attached through attachment stud 73. Attachment stud washer 77 is attached to flared end 74 by welding, and resilient attachment stud pad 78 is glued to attachment stud washer 77. The interior diameter of threaded rod sleeve 72 is chosen so that when threaded rod sleeve 72 is disposed around control rod 40, attachment stud 73 is capable of being rotated approximately ten degrees about an axis perpendicular to control rod 40 and attachment stud 73. Control rod knob 80 mates with threaded end 81 of control rod 40.

Figure 5:
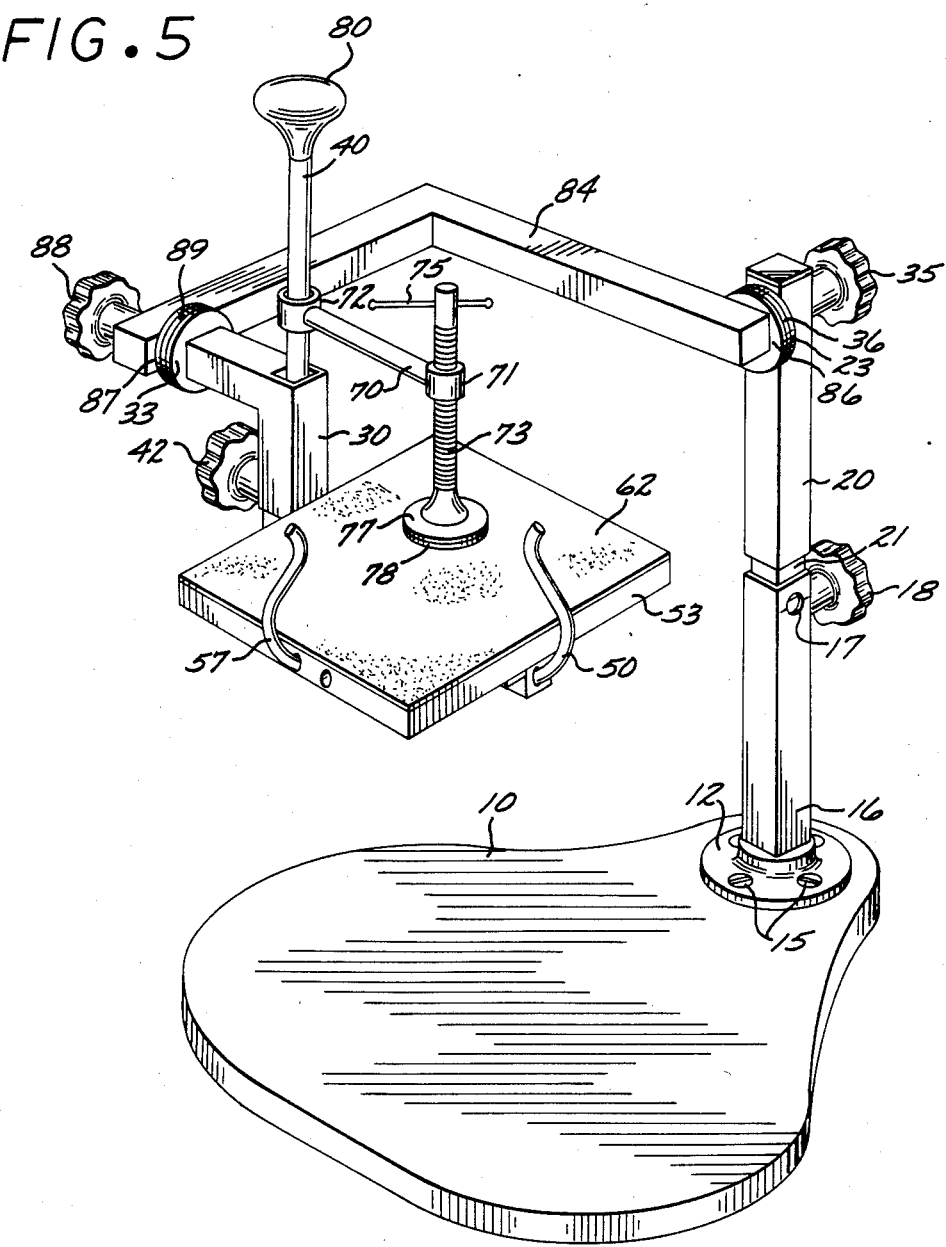
FIG. 5 is a perspective view of a mold holding apparatus illustrating a modification.

FIG. 5 depicts another embodiment of the present invention, showing extension arm 84 having at one end first surface 86 attached to extension arm stud (not shown), said extension arm stud disposed through upper column hole 24, mating with upper column knob 35, with frictional washer 36 disposed between first surface 86 and column surface 23. Extension arm 85 has at the other end second surface 87 and extension arm hole (not shown) such that platform arm stud 34 is capable of being disposed through said extension arm hole, mating with extension arm knob 88 with second frictional washer 89 disposed between second surface 87 and platform arm surface 33.

Figure 4:
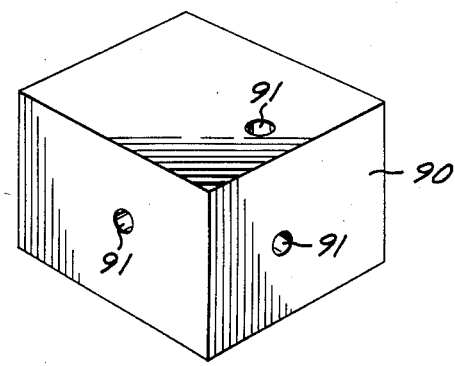
FIG. 4 is a perspective view of a typical mold used with the present invention.

FIG. 4 depicts a typical mold 90 separate from the present invention, with pour holes 91.

When the present invention is in the position as depicted in FIG. 1, mold 90 is placed on platform pad 62 of platform 53 and secured by adjusting longitudinal retaining rod 50 and transverse retaining rod 57 by way of longitudinal retaining rod fastener 49 and one of transverse retaining rod fastener 55. As required by the size of the particular mold in question, transverse retaining rod 57 is disposed within the most appropriate of transverse retaining rod bores 56 and, in addition, may be disposed in either direction through the retaining rod bore 56 so selected. In FIG. 1, the transverse retaining rod bore 56 nearest the center of platform 53 has been selected. Next, platform arm knob 42 is slightly loosened so that lower platform arm 37 can slide vertically with respect to upper platform arm 30, in order to adjust the height of mold 90 so that its center of mass is approximately at the same height as platform arm stud 34. Platform arm striations 38 are marked on lower platform arm 37 so that whenever one of platform arm striations 38 is visible at the center of platform arm sight hole 32, threaded arm knob end 41 of platform arm knob 42 is in position to engage one of said platform arm detents, causing lower platform arm 37 and upper platform arm 30 to be secured together. In the event that the height of mold 90 is such that adjustment downward of lower platform arm 37 prevents rotation of mold 90 about an axis through platform arm stud 34 upon loosening of upper column knob 35, lower column knob 18 may be loosened so that upper column 20 can slide vertically with respect to lower column 16, thus raising the height of mold 90. When the desired height of mold 90 is achieved, one of column neck striations 22 is centered on column sight hole 17 and lower column knob 18 is tightened so that threaded column knob end 19 engages one of said column neck detents, securing upper column 20 with respect to lower column 16.

Attachment rod 70 is then moved so that rod sleeve 72 slides along control rod 40 until attachment stud pad 78 on the surface of attachment stud washer 77 comes in contact with mold 90. Stud handle 75 is next rotated so that attachment stud 73 screws downward with respect to threaded collar 71, causing attachment rod 70 to be rotated upwards approximately five degrees about an axis through control rod 40 and orthogonal to attachment rod 70 and control rod 40, until threaded rod sleeve 72 is cocked with respect to control rod 40 such that the interior surface of threaded rod sleeve contact control rod 40 acting as teeth frictionally securing threaded rod sleeve 72 from translation along control rod 40. In this manner, attachment stud 73 is rotated so as to become parallel and co-planar with control rod 40, permitting great force to be exerted vertically downward on mold 90, securing mold 90 to platform 53.

Once mold 90 is secured to the present invention as depicted in FIG. 1, upper column knob 35 is slightly loosened, and torque is manually applied to control rod knob 80 so that mold 90 is rotated about an axis defined by platform arm stud 34, to a position selected to be proper to pour slip into one of pour holes 91, whereupon upper column knob 35 is tightened. During this rotation procedure, frictional washer 36 permits a smooth and uniform rate of rotation, and once rotation is complete, facilitates rapid, easy, and secure fastening of upper platform arm 30 with respect to upper column 20. The desired quantity of slip is then poured into mold 90, and after the desired set up period has elapsed, upper column knob 35 is slightly loosened, and torque is again manually applied to control knob 80 such that excess slip is slowly and uniformly poured off, thereby preventing vacuum or turbulence from occurring within mold 90, such effects producing defects in the casting. In the case that mold 90 has more than one pour hole 91, upper column knob 35 is again loosened so that the above-described procedure can be followed with respect to the other pour holes 91. After the pouring procedure is completed, stud handle 75 is rotated, loosened attachment stud 73, and longitudinal retaining rod fastener 49 and transverse retaining rod fastener 55 are loosened, permitting mold 90 to be removed from the present invention. In the event pour holes 91 are present on the front or back surfaces of mold 90, reorientation of mold 90 is undertaken with respect to the present invention so that the pour holes 91 previously present on the front or back surfaces of mold 90 are placed on the top and sides of mold 90, and the above-described procedure is repeated.

The use of the present invention is entirely similar in the case of the embodiment depicted in FIG. 5, with the addition that loosening upper column knob 35 permits extension arm 84 to be rotated about an axis defined by said extension arm stud, and after upper column knob 35 is tightened, extension arm knob 88 is loosened, permitting upper platform arm 30 and hence mold 90 to be rotated about an axis defined by platform arm stud 34.

In this manner, two rotational degrees of freedom are obtained with respect to the orientation of mold 90, so that pour holes 91 on the top, sides, front and back of mold 90 may be filled without requiring removal, reorientation, and reattachment of mold 90 to the present invention.

The present invention having been described in its preferred embodiment, it is clear that it is susceptible to numerous modifications and embodiments within the ability of those skilled in the art and without the exercise of the invention faculty. Accordingly, the scope of the present invention is defined by the scope of the following claims.

What is claimed is:

1. Mold holding apparatus comprising:
   a base;
   a column whose length is adjustable, rigidly attached eccentrically and orthogonally to said base;
   a platform;
   an extension arm rotatably attached to said column so that the axis of rotation is perpendicular to said column;
   a platform arm rigidly attached on one end to said platform and rotatably attached on the other end to said extension arm so that the axis of rotation is perpendicular to said column and to the axis of rotation of said extension arm, said platform arm adjustable with respect to the distance between the plane of said platform and the axis of rotation of said platform arm;
   a control rod rigidly attached to said platform arm;
   a first frictional coupling disposed between said column and said extension arm;
   a second frictional coupling disposed between said platform arm and said extension arm;
   an attachment stud having a handle at one end and a flared surface at the other end;
   an attachment rod having a rod sleeve attached at one end so that the axis of said rod sleeve is perpendicular to said attachment rod, whose interior diameter is greater than the exterior diameter of said control rod so that when said rod sleeve is disposed around said control rod, said rod sleeve is capable of rotating approximately ten degrees about an axis perpendicular to the axis of said rod sleeve, and having a threaded collar attached at the other end so that the axis of said threaded collar is co-planar with and defines an angle of approximately five degrees with respect to the axis of said rod sleeve, disposed so that said control rod is slidably moveable through said rod sleeve and said attachment stud mates with said threaded collar so that said attachment stud is inclined towards the bottom of said control rod;
   a curved longitudinal retaining rod slidably attached to said platform arm and projecting above the plane and along a side of said platform; and
   a curved transverse retaining rod slidably attached to platform and projecting above the plane and along an adjacent side of said platform.

* * * * *